United States Patent
Sato et al.

(10) Patent No.: US 7,201,809 B2
(45) Date of Patent: *Apr. 10, 2007

(54) RADIAL ANISOTROPIC RING MAGNET AND METHOD OF MANUFACTURING THE RING MAGNET

(75) Inventors: Koji Sato, Takefu (JP); Mitsuo Kawabata, Takefu (JP); Takehisa Minowa, Takefu (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/526,012

(22) PCT Filed: Aug. 27, 2003

(86) PCT No.: PCT/JP03/10844

§ 371 (c)(1),
(2), (4) Date: Feb. 25, 2005

(87) PCT Pub. No.: WO2004/021371

PCT Pub. Date: Mar. 11, 2004

(65) Prior Publication Data

US 2006/0022782 A1    Feb. 2, 2006

(30) Foreign Application Priority Data

Aug. 29, 2002 (JP) ............................. 2002-250657

(51) Int. Cl.
*H01F 1/08* (2006.01)
(52) U.S. Cl. ...................... 148/103; 148/101
(58) Field of Classification Search ...................... None
See application file for complete search history.

(56) References Cited

U.S. PATENT DOCUMENTS

| | | | | |
|---|---|---|---|---|
| 4,600,555 A | * | 7/1986 | Shimizu | 419/5 |
| 4,678,634 A | * | 7/1987 | Tawara et al. | 419/30 |
| 5,399,311 A | * | 3/1995 | Kasai et al. | 419/28 |
| 6,984,270 B2 | * | 1/2006 | Sato et al. | 148/103 |
| 2002/0075110 A1 | | 6/2002 | Shimizu et al. | |
| 2006/0024192 A1 | * | 2/2006 | Sato et al. | 419/53 |

FOREIGN PATENT DOCUMENTS

| | | | | |
|---|---|---|---|---|
| JP | 52-26498 A | | 2/1977 | |
| JP | 59-99705 | * | 6/1984 | 148/103 |
| JP | 59-115506 | * | 7/1984 | 29/527.1 |
| JP | 59-136910 | * | 8/1984 | 148/103 |
| JP | 61-154118 A | | 7/1986 | |
| JP | 2-281721 A | | 11/1990 | |
| JP | 3-39415 A | | 2/1991 | |
| JP | 5-144632 A | | 6/1993 | |
| JP | 6-28215 B | | 4/1994 | |
| JP | 10-55929 A | | 2/1998 | |
| JP | 2001-176723 A | | 6/2001 | |

OTHER PUBLICATIONS

Abstract of JP-2-281721-A.

* cited by examiner

*Primary Examiner*—John P. Sheehan
(74) *Attorney, Agent, or Firm*—Birch, Stewart, Kolasch & Birch, LLP

(57) ABSTRACT

A radially anisotropic ring magnet endowed with good magnetic characteristics and having throughout the magnet an angle of 80 to 100° between a center axis thereof and a radial anisotropy imparting direction is manufactured by a pressing operation.

5 Claims, 7 Drawing Sheets

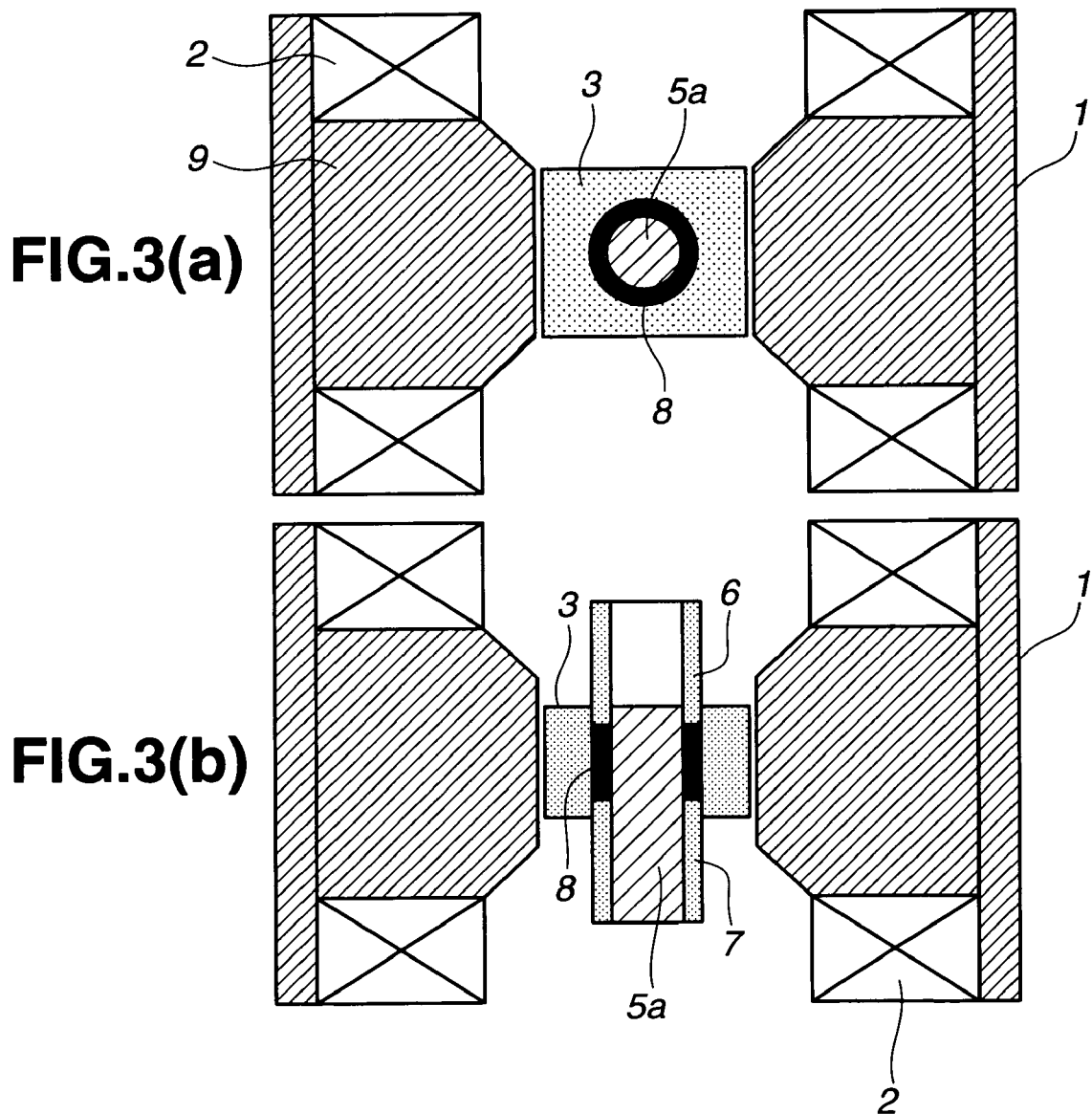

RADIAL ANISOTROPIC RING MAGNET AND METHOD OF MANUFACTURING THE RING MAGNET

TECHNICAL FIELD

The present invention relates to radially anisotropic ring magnets and to a method of manufacturing such magnets.

BACKGROUND ART

Anisotropic magnets produced by milling crystalline, magnetically anisotropic materials such as ferrites or rare-earth alloys and pressing the milled material in a specific magnetic field are widely used in speakers, motors, measuring instruments and other electrical devices. Of these, because magnets with anisotropy in the radial direction in particular are endowed with excellent magnetic properties, are freely magnetizable and require no reinforcement to fix the magnet in place as in the case of segment magnets, they are used in AC servomotors, DC brushless motors and other related applications. The trend in recent years toward higher motor performance has brought with it a demand for elongated radially anisotropic magnets.

Magnets having a radial orientation are manufactured by vertical pressing in a vertical magnetic field or by backward extrusion. Vertical pressing in a vertical magnetic field is characterized by applying opposing magnetic fields through the core of a mold in the pressing direction so as to obtain a radial orientation. That is, as shown in FIG. 1, a magnet powder 8 packed into a mold cavity is radially oriented by means of a magnetic circuit in which magnetic fields generated by orienting magnetic field-generating coils 2 are applied toward each other through cores 4 and 5, pass from the cores through a die 3, and circulate back through the press frame 1. Also shown in FIG. 1 are a top punch 6 and a bottom punch 7.

Thus, in this vertical magnetic field-generating vertical-compacting press, the magnetic fields generated by the coils create a magnetic path consisting of the cores, the die and the press frame. To reduce magnetic field leakage loss, a ferromagnet, and primarily a ferrous metal, is used as the material making up the portions of the press that form the magnetic path. The strength of the magnet powder-orienting magnetic field is set by the following parameters. The core diameter (magnet powder packing inside diameter) is represented below as B, the die diameter (magnet powder packing outside diameter) as A, and the magnet powder packing height as L. Magnetic fluxes which have passed through the top and bottom cores meet from opposite directions at the core center and move on into the die. The amount of magnetic flux that passes through the core is determined by the saturation flux density of the core. The saturation magnetic flux density in an iron core is about 20 kG. Therefore, the strength of the orienting magnetic field at the magnet powder packing inside and outside diameters is obtained by dividing the magnetic flux which has passed through the top and bottom cores by, respectively, the inside surface area and outside surface area of the region in which the magnet powder is packed, as follows:

$$2 \cdot \pi \cdot (B/2)^2 \cdot 20/(\pi \cdot B \cdot L) = 10 \cdot B/L \text{ (inner periphery);}$$

$$2 \cdot \pi \cdot (B/2)^2 \cdot 20/(\pi \cdot A \cdot L) = 10 \cdot B^2/(A \cdot L) \text{ (outer periphery).}$$

Because the magnetic field is smaller at the outer periphery than at the inner periphery, to obtain good orientation in all areas of the packed magnet powder, a magnetic field of at least 10 kOe is required at the outer periphery. As a result, $10 \cdot B^2/(A \cdot L) = 10$, and so $L = B^2/A$. Given that the height of the powder compact is about one-half the height of the packed powder and is reduced further during sintering to about 80%, the magnet ultimately obtained has a very small height. Because core saturation determines in this way the strength of the orienting magnetic field, the size (i.e., height) of the magnet that can be oriented is dependent on the core shape. Manufacturing cylindrical magnets that are elongated in the axial direction has thus been difficult. In particular, it has been possible to manufacture small-diameter cylindrical magnets only to very short lengths.

The backward extrusion process for manufacturing radially oriented magnets is not conducive to the production of low-cost magnets because it requires the use of large equipment and has a poor yield.

Thus, regardless of which method is used, radially anisotropic magnets are difficult to manufacture. The inability to achieve the low-cost, large-volume production of such magnets has in turn made motors that use radially anisotropic magnets very expensive to manufacture.

Recently, owing to a strong desire by manufacturers for lower material and assembly costs, there has been an urgent need to improve the productivity and ease of assembly for radially anisotropic ring magnets as well. On top of this, product miniaturization and labor-saving trends have also created a desire for higher magnet performance. It is believed that elongated radially anisotropic ring magnets can satisfy such requirements by manufacturers. Here, "elongated" is used to refer to ring magnets whose length is greater than the inside diameter.

When such a magnet is achieved by stacking a plurality of short magnets, a number of problems arise. That is, the magnet and the motor core are bonded together with an adhesive or by the magnetic forces of attraction between the magnet and the ferromagnetic motor core. However, when the adhesive fails, because the force of attraction between the magnets is greater than the force of attraction between the magnets and the core, the north poles and south poles on adjacent magnets bond to each other. As a result, the motor ceases to function. Moreover, even when the adhesive has not failed, the forces that try to pull the magnetic north and south poles toward each other create shear stresses on the adhesive that encourage it to fail. By contrast, in a one-piece magnet, such forces do not arise. Even should the adhesive happen to fail, because the magnet and the ferromagnetic motor core are mutually attracted by magnetic forces, they do not separate.

Radially anisotropic ring magnets are manufactured by vertical pressing in a vertical magnetic field as shown in FIG. 1, yet this conventional process is only capable of producing short magnets. A method for producing radial magnets which are elongated bodies of integral construction is disclosed in JP-A 2-281721. However, this prior-art publication describes a multi-stage molding process in which a starting powder that has been filled into a die cavity is magnetically oriented and pressed to form a compact. The compact is transferred to a non-magnetic portion of the die, and the cavity in the magnetic portion of the die that opens up as a result is filled with more starting powder, which is then pressed. The resulting compact is likewise transferred downward. Powder feed and pressing are repeated a desired number of times in this way to obtain an overall compact having a large dimension L in the axial direction of the ring (referred to hereinafter as the "length").

Radially anisotropic ring magnets of substantial length can indeed be manufactured by multi-stage molding. However, this process involves repeatedly feeding and pressing powder, causing joints to form in the powder compact. In addition, the long molding time required to produce a single multilayer powder compact makes such a process unsuitable for mass production. Moreover, the load applied during pressing of the compact is constant, and so sintered bodies obtained from the resulting compacts of uniform density tend to develop cracks at the joints in the powder compact. JP-A 10-55929 discloses a way to reduce crack formation at joints in the powder compact by setting the density of the compact during multi-stage molding to a value of at least 3.1 g/cm$^3$ in the case of Nd—Fe—B-based magnets, and carrying out a final pressing operation (the compact obtained by final pressing being called-herein the "final compact") such as to result in a compact density at least 0.2 g/cm$^3$ higher than the density of the compacts obtained up to that point (referred to herein as "preliminary compacts").

However, this method requires strict pressure control. Moreover, because the condition of the magnet powder varies considerably depending on the particle size and particle size distribution of the magnet powder and the type and amount of binder, the optimal pressure differs each time, making the pressing conditions difficult to set. In addition, if the preliminary compacts have a low density, they are subject to the influence of the magnetic field during the second and subsequent pressing operations, resulting in poor magnetic properties. If the final compact has a low density, cracks form at the joints. On the other hand, a final compact with too high a density will result in disruption of the orientation during final pressing. It is thus exceedingly difficult to manufacture by the foregoing process elongated radially anisotropic ring magnets in such a way as to achieve both good magnetic characteristics and a good yield.

DISCLOSURE OF THE INVENTION

One object of the present invention is to provide radially anisotropic ring magnets which are endowed with good magnetic characteristics. Another object of the invention is to provide a method of manufacturing such radially anisotropic ring magnets by vertical pressing in a horizontal magnetic field.

Accordingly, the invention provides the following radially anisotropic ring magnet and method of manufacture.

(1) A radially anisotropic ring magnet characterized by having throughout the magnet an angle of 80 to 100° between a center axis thereof and a radial anisotropy imparting direction.

(2) The radially anisotropic ring magnet of (1) above which is characterized by having, on a plane perpendicular to the center axis thereof, a magnet powder average degree of orientation with respect to the radial direction of at least 80%.

(3) The radially anisotropic ring magnet of (1) or (2) above which is characterized by having a length in the direction of the center axis and an inside diameter such that the length divided by the inside diameter is at least 0.5.

(4) A method of manufacturing radially anisotropic ring magnets in which a magnet powder packed into a cavity in a cylindrical magnet-forming mold having a core composed at least in part of a ferromagnetic material with a saturation magnetic flux density of at least 5 kG is pressed under the application of an orienting magnetic field by a horizontal magnetic field vertical compacting process; the method being characterized by carrying out at least one of the following operations (i) to (v):

(i) rotate the magnet powder a given angle in the circumferential direction of the mold during application of the magnetic field, (ii) rotate the magnet powder a given angle in the circumferential direction of the mold following application of the magnetic field, then again apply a magnetic field, (iii) rotate a magnetic field-generating coil a given angle in the circumferential direction of the mold with respect to the magnet powder during application of the magnetic field, (iv) rotate a magnetic field-generating coil a given angle in the circumferential direction of the mold with respect to the magnet powder following application of the magnetic field, then again apply a magnetic field, (v) use a plurality of coil pairs to first apply a magnetic field with one coil pair, then apply a magnetic field with the other coil pair so as to apply to the magnet powder a magnetic field from a plurality of directions rather than one direction and thereby manufacture in a pressing operation a radially anisotropic ring magnet having throughout the magnet an angle of 80 to 100° between a center axis thereof and a radial anisotropy imparting direction.

(5) The method of manufacturing radially anisotropic ring magnets according to (4) above which is characterized in that, if the packed magnet powder is rotated, such rotation is effected by rotating at least the core, die or punch of the mold in the circumferential direction thereof.

(6) The method of manufacturing radially anisotropic ring magnets according to (4) above which is characterized in that, if the packed magnet powder is rotated after application of a magnetic field, the ferromagnetic core and the magnet powder have remanent magnetization values of at least 50 G and the magnet powder is rotated by rotating the core in the circumferential direction.

(7) The method of manufacturing radially anisotropic ring magnets according to any one of (4) to (6) above which is characterized in that the magnetic field generated during vertical pressing within a horizontal magnetic field is from 0.5 to 10 kOe.

(8) The method of manufacturing radially anisotropic ring magnets according to any one of (4) to (7) above which is characterized in that the magnetic field generated by the horizontal magnetic field-generating vertical-compacting press just before or during pressing is from 0.5 to 3 kOe.

(9) The method of manufacturing radially anisotropic ring magnets according to any one of (4) to (8) above which is characterized in that, after applying a magnetic field one or more times, the magnet powder is rotated 60 to 120°+n×180° (where n is an integer≧0) under the application of a coil-generated magnetic field of at least 0 but less than 0.5 kOe, the latter magnetic field being from $\frac{1}{20}$ to $\frac{1}{3}$ as large as the magnetic field previously applied, and the magnet powder is pressed during or after said application.

The present invention enables the low-cost, large-volume supply of radially anisotropic ring magnets which have an excellent performance and are easy to work with in assembly operations.

BRIEF DESCRIPTION OF THE DRAWINGS

FIG. 1 shows a prior-art vertical magnetic field-generating vertical-compacting press used to manufacture radially anisotropic cylindrical magnets.

FIG. 3 shows an example of a horizontal magnetic field-generating vertical-compacting press used to manufacture cylindrical magnets. FIG. 3(*a*) is a plan view, and FIG. 3(*b*) is a longisectional view.

FIG. 4(*a*) shows a press according to the present invention, and FIG. 4(*b*) shows a prior-art press.

BEST MODE FOR CARRYING OUT THE INVENTION

The invention is described more fully below. The description that follows relates primarily to Nd—Fe—B-based cylindrical sintered magnets. However, it is not limited only to Nd—Fe—B-based magnets, and applies as well to the manufacture of ferrite magnets, Sm—Co-based rare-earth magnets and various types of bonded magnets.

Figure 2:
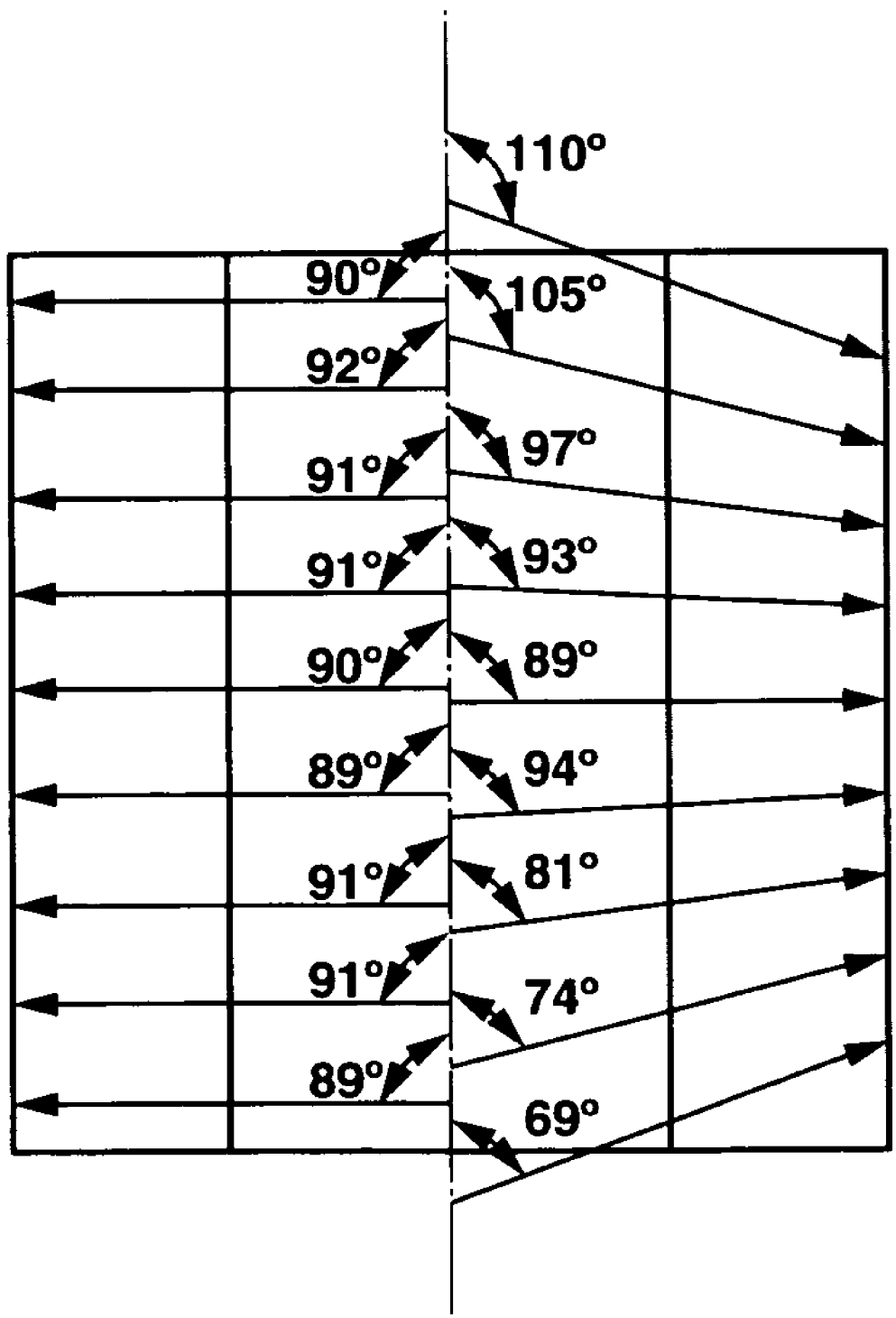
FIG. 2 is a diagram showing the angles of various radial anisotropy imparting directions with respect to the center axis of a ring magnet.

The radially anisotropic ring magnets of the invention are preferably manufactured by carrying out a pressing operation in a magnetic field that is shifted just prior to pressing. Moreover, as shown in FIG. 2, the inventive ring magnet has throughout it an angle of 80 to 100° between the center axis of the magnet and a radial anisotropy imparting direction. Preferably, the inventive magnet has, on a plane perpendicular to the center axis thereof, a magnet powder average degree of orientation with respect to the radial direction of at least 80%. It is also preferable for the inventive magnet to have a length in the direction of the center axis and an inside diameter such that the length divided by the inside diameter is at least 0.5.

As the angle between the center axis of the ring magnet and the radial anisotropy imparting direction departs further from a range of 80 to 100°, only the cosine component of the magnetic flux generated by the radially anisotropic ring magnet ends up contributing to the rotational force in a motor, resulting in a smaller motor torque. Hence, the angle between the center axis of the ring magnet and the radial anisotropy imparting direction must be within a range of 80 to 100°. In addition, most practical applications for radially anisotropic ring magnets are electric motors such as AC servomotors and DC brush motors. When a radially anisotropic ring magnet is used in a motor, skew is imparted to the magnet or stator to counteract cogging. If the angle between the center axis of the ring magnet and the radial anisotropy imparting direction falls outside a range of 80 to 100°, the effectiveness of skewing diminishes. This tendency is especially pronounced in cases where the angle between the center axis of the ring magnet and the radial anisotropy imparting direction departs substantially from 80 to 100° at the ends of the radially anisotropic ring magnet in the length direction thereof. When skew is imparted, there are places on the magnet where the ends and the center portion are of opposite polarity; the ratio of magnetic flux at the north and south poles changes linearly and gradually, thus reducing cogging. However, at the ends of the magnet, the angle between the center axis of the ring magnet and the radial anisotropy imparting direction departs substantially from 80 to 100°; hence, the magnetic flux at the ends which have a polarity opposite to the polarity at the center of the magnet becomes small.

Figure 1A:
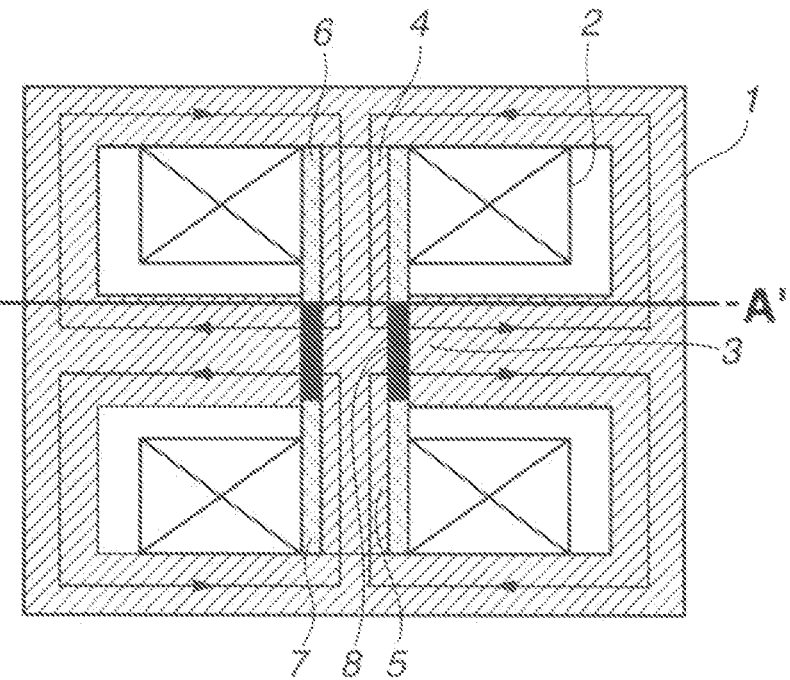
FIG. 1(a) is a longisectional view.
Figure 1B:
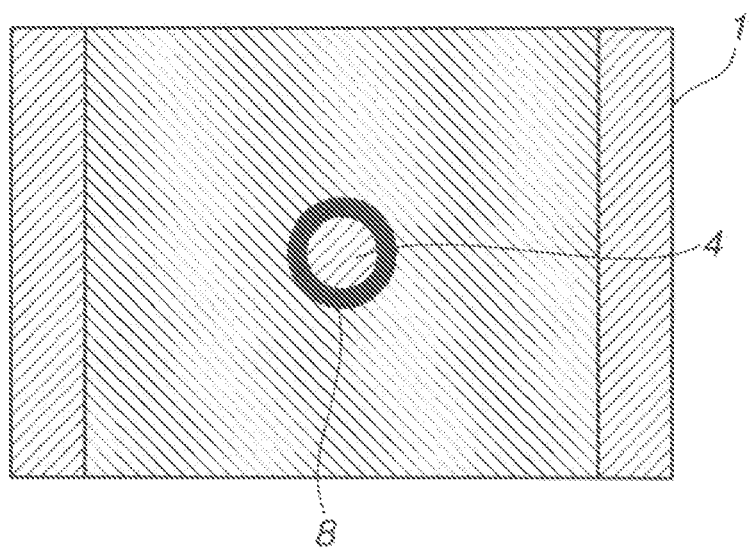
FIG. 1(b) is a cross-sectional view taken along line A–A' in FIG. 1(a).

Magnets in which the departure from an angle of 100° at the ends thereof is particularly large arise in the following manufacturing process. Radially anisotropic ring magnets have hitherto been produced by vertical pressing in a vertical magnetic field as shown in FIG. 1. However, as noted above, conventional methods are only able to produce short ring magnets. In ring magnets produced by a multi-stage compacting process, separation occurs at joints within the resulting magnet, and disturbances in the magnetic poles arise. Moreover, the magnet may break up into sections; because surface treatment at the separation planes is impossible, this leads to corrosion. When orientation is carried out using the vertical magnetic field-generating vertical-compacting press shown in FIG. 1, if a magnetic field stronger than the saturation magnetization of the core is applied in order to achieve a greater magnet length, following core saturation, the lines of magnetic force from the top punch magnetic field-generating coil and the bottom punch magnetic field-generating coil meet from opposite directions without passing through the core, and generate a magnetic field in the radial direction. However, the angle between the center axis of the core and the radial anisotropy imparting direction departs significantly from 80 to 100°, a tendency which increases near the top and bottom punches. As a result, the angle between the center axis of the ring magnet and the radial anisotropy imparting direction becomes small at the ends of the magnet, making this process unsuitable for the manufacture of radially anisotropic ring magnets.

It is therefore critical for the ring magnet to have throughout an angle between the center axis thereof and the radial anisotropy imparting direction of from 800 to 100°.

The degree of orientation f of a magnet is computed as follows.

$$f = Br/[Is \times \{\rho/\rho_0 \times (1-\alpha)\}^{2/3}]$$

In the above formula, Br represents the remanent flux density, Is stands for the saturation magnetization, $\rho$ is the density of the sintered body, $\rho_0$ is the theoretical density, and $\alpha$ is the volumetric ratio of the nonmagnetic phase.

At a low degree of orientation, the magnetic flux generated by the magnet is low and the motor torque is small. Moreover, the magnetizability may suffer. Because motor magnetization is often carried out using the motor rotor, a decline in magnetizability can be a serious problem. Accordingly, in the radially anisotropic ring magnets of the invention, the magnet powder has an average degree of orientation of preferably at least 80%, and most preferably 80 to 100%.

For ease of handling in assembly operations, it is preferable that the ring magnet have a length in the direction of the center axis and an inside diameter such that the length divided by the inside diameter (length/inside diameter) is at least 0.5, and preferably from 0.5 to 50.

Such radially anisotropic ring magnets are preferably manufactured using the process of vertical pressing in a horizontal magnetic field described below. FIG. 3 shows a horizontal magnetic field-generating vertical-compressing press for carrying out orientation in a magnetic field during pressing of a cylindrical magnet. This diagram illustrates in particular a horizontal magnetic field-generating vertical-compressing press for making motor magnets. As in FIG. 1, the diagram shows a press frame 1, orienting magnetic field-generating coils 2, a die 3, and a core 5a. Also shown are a top punch 6, a bottom punch 7, a packed magnet powder 8, and pole pieces 9.

In the practice of the invention, at least part and preferably all of the core 5a is composed of a ferromagnet having a saturation magnetic flux density of at least 5 kG, preferably 5 to 24 kG, and most preferably 10 to 24 kG. Examples of suitable core materials include ferromagnets prepared using ferrous materials, cobalt-based materials, or alloys thereof.

Figure 4A:
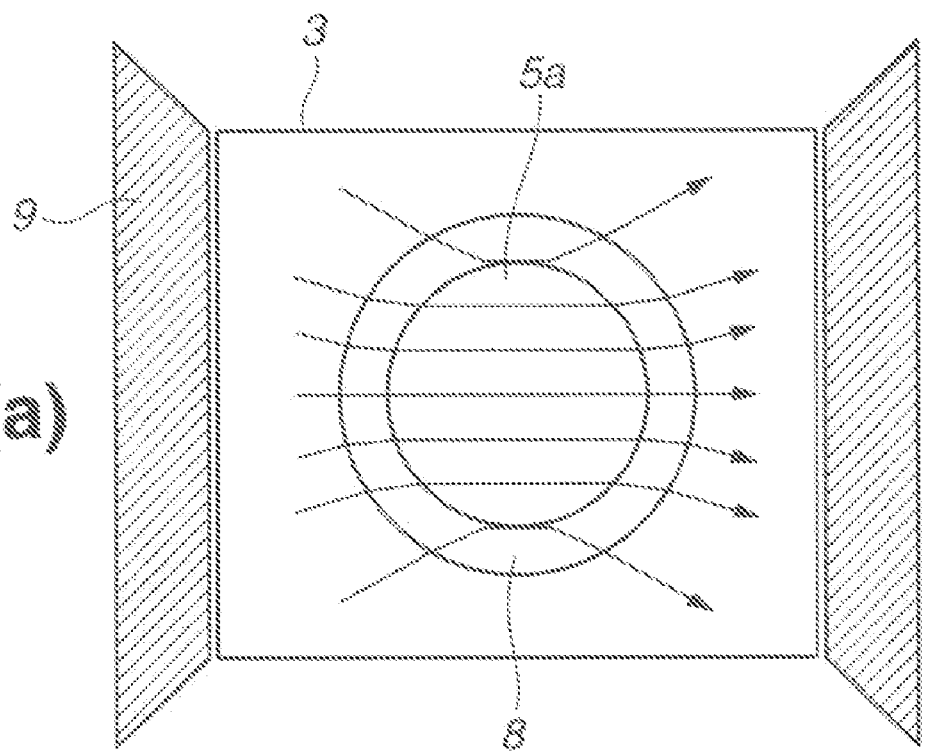
FIG. 4 schematically shows the magnetic lines of force when a magnetic field is generated by a horizontal magnetic field-generating vertical-compacting press during the production of a cylindrical magnet.
Figure 4B:
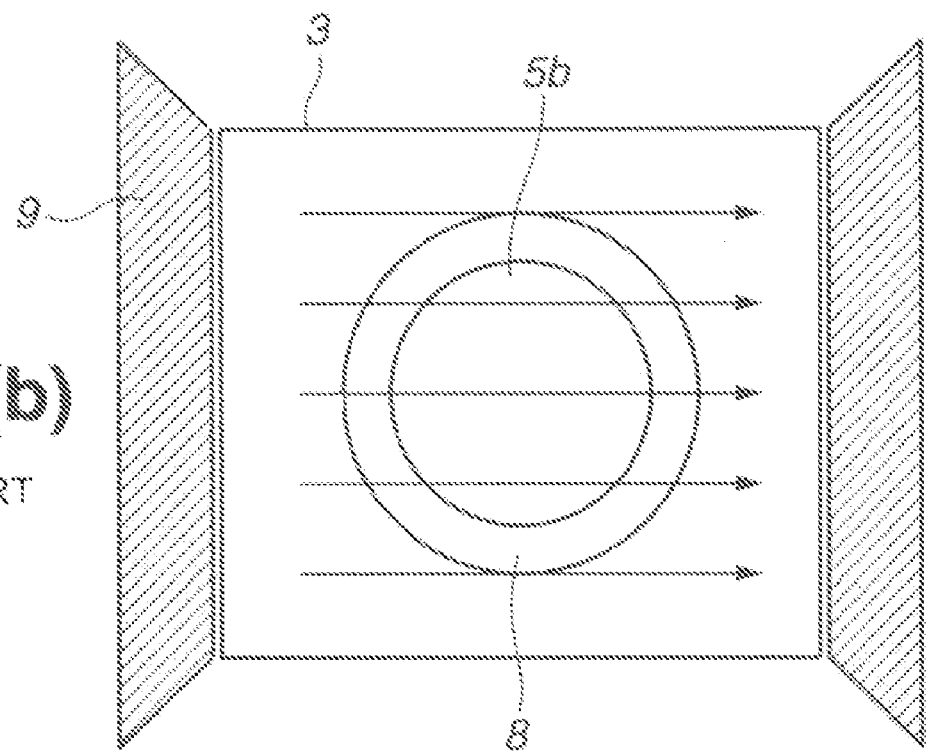

By using a ferromagnet having a saturation flux density of at least 5 kG in the core, when an orienting magnetic field is applied to the magnet powder, the magnetic flux tries to enter the ferromagnet perpendicularly, creating lines of magnetic force that are nearly radial. Thus, as shown in FIG. 4a, the direction of the magnetic field in the region packed with magnet powder can be made to approach a radial orientation. By contrast, in the prior art, the overall core 5b is made of a material which is either nonmagnetic or has a saturation magnetic flux density comparable to that of the magnet powder. In this case, as shown in FIG. 4b, the lines of magnetic force are mutually parallel; in the diagram, although the lines of force do extend in the radial direction near the center, toward the top and bottom sides they merely extend in the direction of the orienting magnetic field generated by the coils. Even when the core is made of a ferromagnet, if it has a saturation flux density of less than 5 kG, it is readily saturated. In such cases, in spite of the use of a ferromagnetic core, the magnetic field will be in a state close that shown in FIG. 4b. In addition, at a saturation flux density of less than 5 kG, the core has the same saturation flux density as the packed magnet powder (saturation flux density of packed magnet powder=saturation flux density of magnet x packing density) and the direction of magnetic flux within the packed magnet powder and the ferromagnetic core becomes the same as the direction of the magnetic field generated by the coils.

The use of a ferromagnet having a saturation flux density of at least 5 kG as part of the core provides effects similar to those described above and is thus acceptable, although it is preferable for the entire core to be made of a ferromagnet.

However, simply forming the core material of a ferromagnet does not in and of itself result in a radial orientation in directions close to perpendicular to the direction of the orienting magnetic field generated by the coils. When a ferromagnet is present in a magnetic field, because the magnetic flux is drawn to the ferromagnet in such a way as to try to enter the ferromagnet perpendicularly, the magnetic flux density rises at surfaces of the ferromagnet lying in the direction of the magnetic field and falls at surfaces perpendicular to the magnetic field. Therefore, when a ferromagnet core is placed within the mold, the packed magnet powder is well-oriented by the strong magnetic field at surfaces of the ferromagnet core which are parallel to the direction of the magnetic field, but is not oriented very much at surfaces of the core perpendicular to the magnetic field. To compensate for this, the magnet powder is rotated relative to the magnetic field generated by the coils, either during or after application of the field, so as to place incompletely oriented areas in positions that are parallel to the magnetic field and thus subject to a higher flux density in order to reorient them. This enables a good magnet to be achieved. Relative rotation of the magnet powder, either after application of the magnetic field or in a magnetic field that is no more than one-third the initially applied field, is even more preferable. Although the areas of the magnet powder that are initially oriented in this way may be put in positions that are perpendicular to the applied magnetic field in subsequent orientation, because the magnetic flux density at such positions is small, the good initial orientation is not disturbed to any significant degree.

The method of rotating the magnet powder relative to the magnetic field generated by the coil involves carrying out at least one of operations (i) to (v) below, either once or a plurality of times after changing the magnetic field each time:

(i) rotate the magnet powder a given angle in the circumferential direction of the mold during application of the magnetic field;
(ii) rotate the magnet powder a given angle in the circumferential direction of the mold following application of the magnetic field, then again apply a magnetic field;
(iii) rotate a magnetic field-generating coil a given angle in the circumferential direction of the mold with respect to the magnet powder during application of the magnetic field;
(iv) rotate a magnetic field-generating coil a given angle in the circumferential direction of the mold with respect to the magnet powder following application of the magnetic field, then again apply a magnetic field;
(v) use a plurality of coil pairs to first apply a magnetic field with one coil pair, then apply a magnetic field with the other pair of coil.

Figure 5:
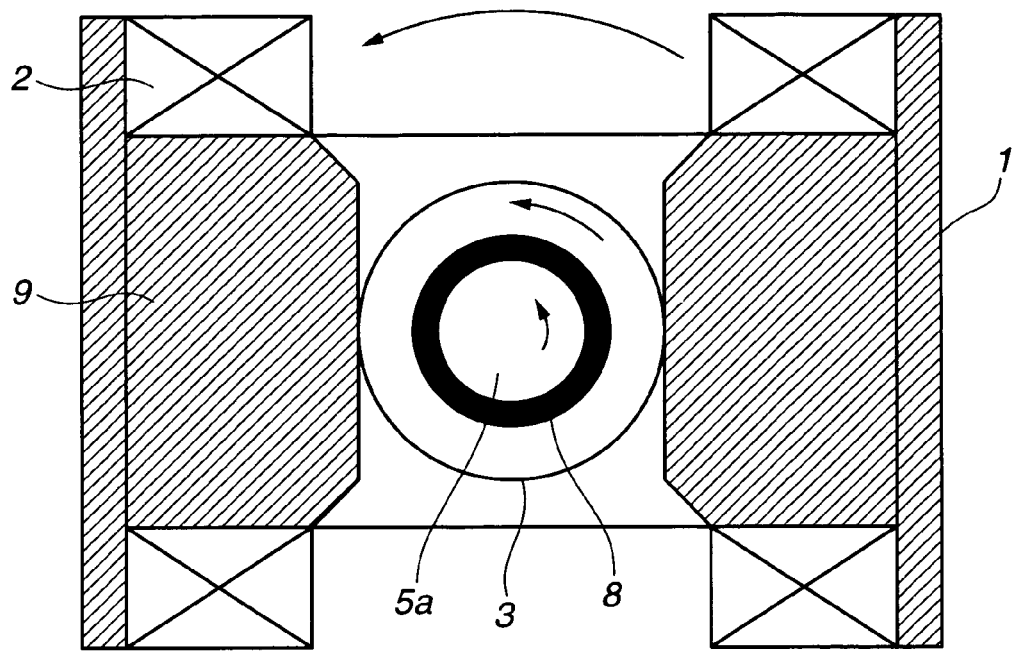
FIG. 5 shows a rotary horizontal magnetic field-generating vertical-compacting press used for manufacturing cylindrical magnets.

So long as the packed magnet powder is rotatable relative to the direction of the coil-generated magnetic field in the manner shown in FIG. 5, such rotation may be effected by rotating the orienting field-generating coils 2, the core 5a, the die 3 or the top and bottom punches 6 and 7. In those cases in particular where the packed magnet powder is rotated following application of the magnetic field, if the ferromagnetic core and the magnet powder are provided with a remanent magnetization of at least 50 G, and preferably at least 100 G, forces of magnetic attraction will arise between the magnet powder and the ferromagnetic core, enabling rotation of the magnet powder to be effected merely by rotating the ferromagnetic core.

Because using a plurality of coil pairs to first apply a magnetic field in one direction then apply a magnetic field in another direction is substantially the same as rotating the magnetic field direction and the magnet powder relative to each other, this method may also be employed to achieve the same effect.

When rotation is carried out before magnetic field application just prior to the pressing operation, the magnetic field applied following rotation is small. Thus, applying a large magnetic field during rotation will prevent the final application of a magnetic field following rotation from having an observable effect. For this reason, the strength of the magnetic field applied during rotation is preferably 0 to 0.5 kOe, and more preferably 0.3 kOe or less. Rotation in the absence of a magnetic field is typically preferred. Because those sites in the magnet powder which are disturbed by the application of a magnetic field prior to rotation are at positions perpendicular to the direction of the magnetic field prior to rotation, the angle of rotation for alleviating disturbances at these sites is preferably from 60 to 120°+n×180° (where n is an integer≧0), and more preferably 90°+n×180° (where n is an integer≧0) ±10°. The angle of rotation is typically 90°+n×180° (where n is an integer≧0). If a strong magnetic field is applied prior to rotation, this results in a large deviation from a radial orientation in the direction perpendicular to the applied magnetic field direction. Hence, unless the strength of the magnetic field applied following rotation also is made larger than in cases where the magnetic field prior to rotation is weak, the disruption in orientation is not alleviated. Yet, if the magnetic field applied following rotation is too strong, the resulting orientation will deviate from a radial orientation in the direction perpendicular to the magnetic field direction. Hence, the magnetic field applied following rotation is preferably from 1/20 to 1/3, and most preferably from 1/10 to 1/3, as large as the magnetic field applied before rotation.

Here, when the magnetic field generated in a horizontal magnetic field-generating vertical-compacting press is large, the core 5a in FIG. 4a becomes saturated and assumes a state close to that shown in FIG. 4b. That is, the orienting magnetic field imparts a nearly parallel orientation rather than a radial orientation. Hence, it is preferable for the magnetic field to have a strength of not more than 10 kOe. When a ferromagnetic core is used, the magnetic flux concentrates in the core, creating a magnetic field which, in the vicinity of the core, is larger than the magnetic field generated by the coils. However, if the orienting magnetic field is too small, a magnetic field sufficient for orientation will not be achieved even in the vicinity of the core. Accordingly, an applied magnetic field strength of at least 0.5 kOe is preferred. As just noted, due to concentration of the magnetic flux in the vicinity of the ferromagnet, the magnetic field here becomes larger. Therefore, the phrase "magnetic field generated by the horizontal magnetic field-generating vertical-compacting press" refers herein to the magnetic field in places at a sufficient remove from the ferromagnet, or to magnetic field values measured in the absence of the ferromagnetic core.

Rotating the magnet powder relative to the direction of the magnetic field generated by the coils enables incompletely oriented areas to be re-oriented by the strong magnetic field in the magnetic field direction. Although initially oriented areas may end up in areas perpendicular to the magnetic field at the time of the subsequent orientation, as has already been explained, because the magnetic flux density in such areas is low, the good initial orientation is not disrupted to any significant degree. However, if the magnetic field generated is relatively large, localized disruption does sometimes occur. In such cases, just prior to the pressing operation, by rotating the magnet powder about 90° relative to the direction of the coil-generated magnetic field without applying a magnetic field, then applying a magnetic field smaller than that applied during pressing, preferably a magnetic field of 0.5 to 3 kOe, and subsequently pressing the powder, reorientation can be effected only in the magnetic field direction, enabling a more complete radial orientation to be achieved. If the magnetic field generated by the horizontal magnetic field-generating vertical compacting press prior to the pressing operation exceeds 3 kOe, as noted above, the application of a magnetic field of this size subjects areas that already have a good orientation to an unnecessary magnetic field, which is undesirable. On the other hand, a magnetic field generated by the press which is less than 0.5 kOe is too weak to improve orientation. Hence, a magnetic field within a range of 0.5 to 3 kOe is preferred.

Moreover, in working the present invention, it is desirable to impart orientation a number of times. Decreasing the magnetic field strength in a plurality of stages is advantageous. It is especially preferable to impart orientation three times. Carrying out such orientation up to five times is advantageous for achieving good magnetic characteristics.

Aside from the above-described conditions, the radially anisotropic ring magnet of the invention can be obtained by an otherwise ordinary vertical pressing process in a horizontal magnetic field which includes applying an orienting magnetic field to the magnet powder, compacting the powder in a pressure range of 50 to 2,000 kg/cm², and firing the pressed compact in an inert gas at 1,000 to 1,200° C. The sintered body is then subjected to such operations as aging treatment and machining to give a sintered magnet. The invention may enable magnets of the required axial length to be obtained by a single powder feeding operation and a single pressing operation, although several pressing operation may be employed.

The magnet powder used in the process of the invention is not subject to any particular limitation. The inventive process is especially well-suited to the manufacture of Nd—Fe—B-based cylindrical magnets, but can also be effectively used to manufacture ferrite magnets, Sm—Co-based rare-earth magnets and various types of bonded magnets. In each of these cases, pressing is preferably carried out using an alloy powder having an average particle size of 0.1 to 10 μm, and especially 1 to 8 μm.

EXAMPLE

Examples of the invention and comparative examples are given below to illustrate the invention, and are not intended to limit the scope thereof.

EXAMPLES AND COMPARATIVE EXAMPLES

Neodymium, dysprosium, iron, cobalt and M (where M stands for aluminum, silicon or copper), each having a purity of 99.7 wt %, and boron of 99.5 wt % purity were melted and cast in a vacuum melting furnace to produce ingots composed of a $Nd_2Fe_{14}B$-based magnet alloy ($Nd_{31.5}Dy_2Fe_{62}Co_3B_1Cu_{0.2}Al_{0.3}Si_1$; subscripts indicate percent by weight). The ingot was crushed with a jaw crusher, then reduced to an average particle size of 3.5 μm in a jet mill using a stream of nitrogen. The resulting powder was molded in the horizontal magnetic field-generating vertical-compacting press shown in FIG. 3 about a ferromagnet core (S50C) having a saturation magnetic flux density of 20 kG.

In Example 1, the magnet powder was oriented in a coil-generated magnetic field of 4 kOe, following which the coils were rotated 90° and the powder was compacted under an orienting magnetic field of 1 kOe and a pressure of 500 kgf/cm². The mold used at this time had an outside diameter of 30 mm, an inside diameter of 17 mm, and a cavity 60 mm deep. The packing density of the magnet powder was 33%. The powder compact was sintered in argon at 1,090° C. for one hour, following which the sintered body was heat-treated at 490° C. for one hour. The resulting radial magnet had an outside diameter of 26 mm, an inside diameter of 19 mm and a length of 27 mm (length/inside diameter=1.4). A sample measuring 2 mm on a side was cut in the magnetic field direction from the center portion of the magnet, and the magnetic properties of the sample were measured using a vibrating sample magnetometer (VSM). The results were as follows: remanent flux density (Br)=12.1 kG, coercivity (iHc)=15 kOe, degree of orientation=89%. The angle formed between the center axis of the ring magnet and the radial anisotropy imparting direction was 87° at the longitudinal center, 91° at 3 mm from the top face and 89° at 3 mm from the bottom face of the magnet.

In Example 2, the same type of mold and magnet powder were used as in Example 1. The packing density of the magnet powder was 32%. The powder was oriented in a coil-generated magnetic field of 4 kOe, following which the die, core and punches were rotated 90° and the powder was compacted under an orienting magnetic field of 1.5 kOe and a pressure of 500 kgf/cm². The powder compact was sintered in argon at 1,090° C. for one hour, then the sintered body was heat-treated at 490° C. for one hour. The resulting radial magnet had an outside diameter of 26 mm, an inside diameter of 19 mm and a length of 27 mm (length/inside diameter=1.4). A sample measuring 2 mm on a side was cut in the magnetic field direction from the center portion of the magnet, and the magnetic properties were measured with a VSM. The results were as follows: Br=12.0 kG, iHc=15 kOe, degree of orientation=88%.

In Example 3, the same type of mold and magnet powder were used as in Example 1. The packing density of the magnet powder was 32%. The powder was oriented in a coil-generated magnetic field of 4.5 kOe, following which the core, which had a remanent magnetization at the tip of 0.2 kG, was rotated 90°. The remanent magnetization of the magnet powder at this time was 600 G. The powder was compacted under an orienting magnet field of 0.7 kOe and a pressure of 500 kgf/cm². The powder compact was sintered in argon at 1,090° C. for one hour, following which the sintered body was heat-treated at 490° C. for one hour. The resulting radial magnet had an outside diameter of 26 mm, an inside diameter of 19 mm and a length of 27 mm (length/inside diameter=1.4). A sample measuring 2 mm on a side was cut in the magnetic field direction from the center portion of the magnet, and the magnetic properties were measured with a VSM. The results were as follows: Br=11.9 kG, iHc=15 kOe, degree of orientation=87%.

The magnets obtained in Examples 1, 2 and 3were subsequently machined, giving cylindrical magnets having an outside diameter of 25 mm, an inside diameter of 20 mm and a length of 25 mm.

Figure 6:
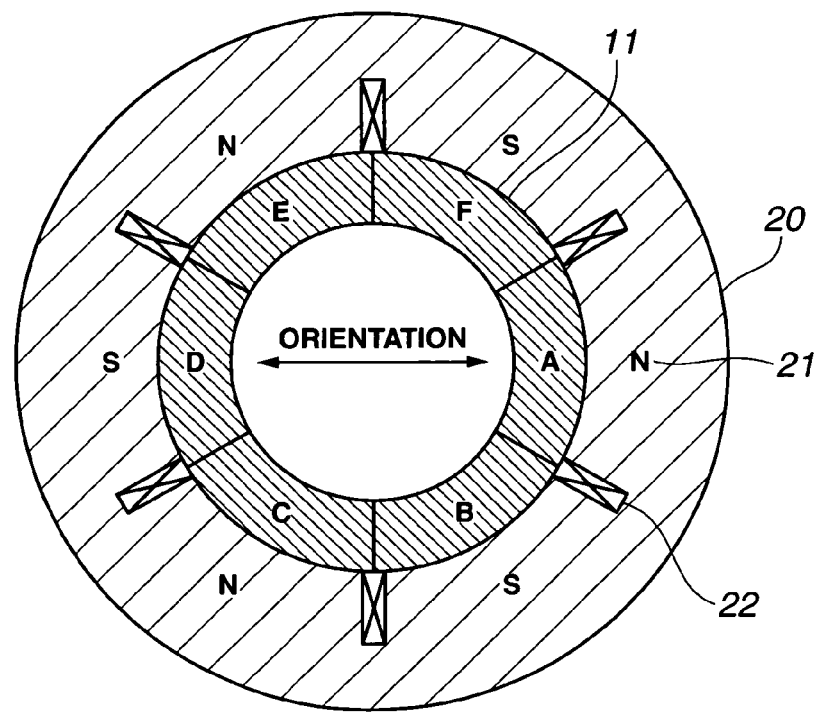
FIG. 6 is a schematic view of a cylindrical magnet being magnetized with a magnetizer.

These cylindrical magnets were skew magnetized (sextupole configuration, 20°) using the magnetizer shown in FIG. 6. In each case, a motor was then built in which the resulting magnetized magnet was installed within a stator of the same height as the magnet and having the construction shown in FIG. 7.

Figure 7:
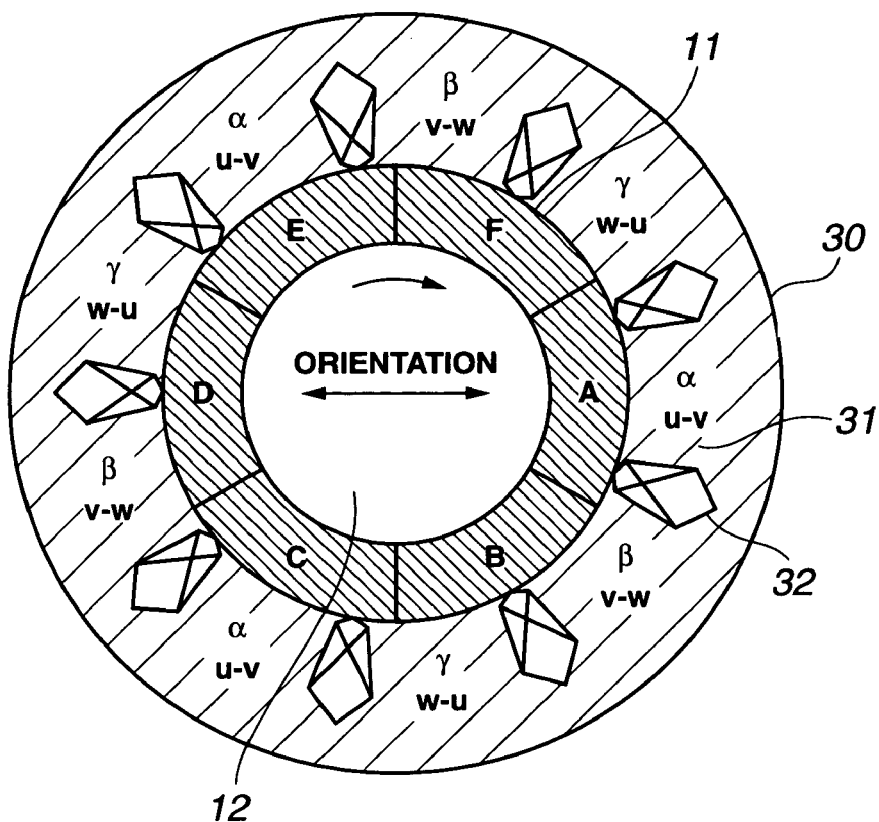
FIG. 7 is a plan view of a three-phase motor assembled from a cylindrical magnet subjected to multipolar magnetization in a sextupole configuration and nine stator teeth.

FIGS. 6 and 7 show a cylindrical magnet 11, a magnetizer 20, magnetizer pole teeth 21, a magnetizer coil 22, a three-phase motor 30, stator teeth 31, and a coil 32.

The motor obtained in Example 1 was rotated at 5,000 rpm and the induced electromotive force was measured. In addition, the degree of torque ripple with rotation of the same motor at 5 rpm was measured with a torque transducer. Similar measurements were carried out in the other examples. Table 1 shows the maximum absolute value for the induced electromotive force in each example, and also the difference between the maximum and minimum torque ripple.

In Example 4, using the same horizontal magnetic field-generating vertical-compacting press in which the coils can be rotated as in Example 1, orientation was carried out with 90° rotation in a 10 kOe magnetic field. This was followed by 90° rotation in the absence of a magnetic field, after which the powder was compacted under a pressure of 500 kgf/cm while subjecting the powder to orientation once again in a 1.5 kOe magnetic field. The powder compact was sintered in argon at 1,090° C. for one hour, following which the sintered body was heat-treated at 490° C. for one hour. The resulting radial magnet had an outside diameter of 26 mm, an inside diameter of 19 mm and a length of 27 mm (length/inside diameter=1.4). A sample measuring 2 mm on a side was cut in the magnetic field direction from the center portion of the magnet, and the magnetic properties were measured with a VSM. The results were as follows: Br=12.0 kG, iHc=15 kOe, degree of orientation=88%. The magnet was machined to the same shape as in Example 1, and the motor characteristics were measured.

In Comparative Example 1, use was made of a vertical magnetic field-generating vertical-compacting mold. The mold shape and core material were the same as in Example 1, but the die material was SKD11 having a saturation magnetic flux density of 15 kG. The packing density of the magnet powder was 33%, and opposing 30 kOe pulsed magnetic fields were applied from top and bottom coils. The powder was subsequently compacted under a pressure of 500 kgf/cm². The powder compact was sintered in argon at 1,090° C. for one hour, then heat-treated at 490° C. for one hour. The resulting radial magnet had an outside diameter of 27 mm and an inside diameter of 19.5 mm at the top and bottom thereof, an outside diameter of 26 mm and an inside diameter of 18.7 mm at the center, and a length of 27 mm. The average value for the length/inside diameter ratio was 1.35. A sample measuring 2 mm on a side was cut in the magnetic field direction from the center portion of the magnet, and the magnetic properties were measured with a VSM. The results were as follows: Br=11.8 kG, iHc=15 kOe, degree of orientation=87%. At a distance of 3 mm from the top and bottom faces of the magnet, the angle formed between the center axis of the ring magnet and the radial anisotropy imparting direction was 120° at 3 mm from the top face and 60° at 3 mm from the bottom face of the magnet. The magnet was machined to the same shape as in Example 1, and the same motor characteristics of the magnet were measured as in Example 1.

In Comparative Example 2, use was made of a vertical magnetic field-generating vertical-compacting mold. The mold shape and core material were the same as in Example 1, but the die material was SKD11 having a saturation magnetic flux density of 15 kG. The packing density of the magnet powder was 28%, and opposing 3 kOe pulsed magnetic fields were applied from top and bottom coils. The powder was subsequently compacted under a pressure of 300 kgf /cm². The powder compact was sintered in argon at 1,090° C. for one hour, then heat-treated at 490° C. for one hour. The resulting radial magnet had an outside diameter of 25.8 mm, an inside diameter of 19.5 mm, and a length of 27 mm. The average value for the length/inside diameter ratio was 1.4. A sample measuring 2 mm on a side was cut in the magnetic field direction from the center portion of the magnet, and the magnetic properties were measured with a VSM. The results were as follows: Br=9.5 kG, iHc=16 kOe, degree of orientation=70%. The magnet was machined to the same shape as in Example 1, and the motor characteristics were measured.

In Comparative Example 3, the magnet powder was oriented in a 4 kOe magnetic field under the same compacting conditions as in Example 1, but the subsequent procedure differed. That is, the magnet powder was then compacted under a pressure of 500 kgf/cm² in the magnetic field in this state without rotation. Next, the powder compact was sintered in argon at 1,090° C. for one hour, after which it was heat-treated at 490° C. for one hour. The resulting radial magnet had an outside diameter of 26 mm, an inside diameter of 19 mm and a length of 27 mm (length/inside diameter=1.4). A sample measuring 2 mm on a side was cut in the magnetic field direction from the center portion of the magnet, and the magnetic properties were measured with a VSM. The results were as follows: Br=12.3 kG, iHc=15 kOe, degree of orientation=90%. Separately another sample measuring 2 mm on a side was cut from the center portion of the magnet in a direction shifted 90° on a plane perpendicular to the ring center axis from the magnetic field direction, and the magnetic properties were measured, with the results: Br=2.5 kG, iHc=15.8 kOe, degree of orientation=18%. The magnet was machined to the same shape as in Example 1, and the motor characteristics were measured.

The results from the examples and comparative examples are given in Table 1.

TABLE 1

| | Induced electromotive force (effective value) (mV/rpm) | Torque ripple (mNm) |
|---|---|---|
| Example 1 | 15.7 | 6.7 |
| Example 2 | 15.8 | 6.7 |
| Example 3 | 15.6 | 6.6 |
| Example 4 | 15.3 | 6.5 |
| Comparative Example 1 | 13.2 | 8.4 |
| Comparative Example 2 | 9.5 | 5.9 |
| Comparative Example 3 | 11.8 | 6.3 |

It is apparent from Table 1 that the induced electromotive force, which corresponds to torque, is much larger in the examples according to the invention than in the comparative examples. This demonstrates that the method of the invention is an excellent way to manufacture magnets for motors.

Figure 8:
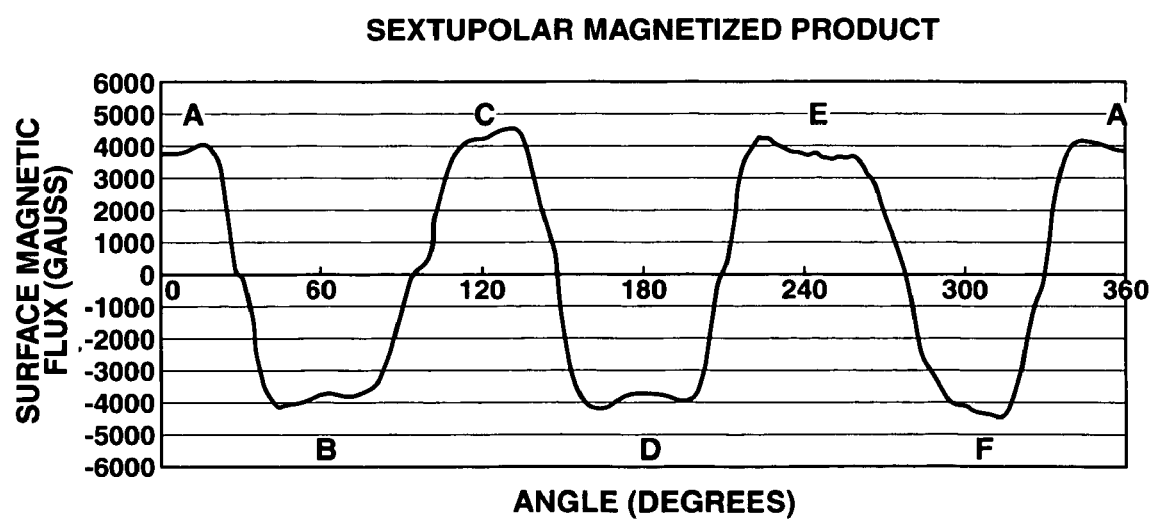
FIG. 8 shows the surface magnetic flux density when a Nd—Fe—B-based cylindrical magnet manufactured in accordance with the present invention using a horizontal magnetic field-generating vertical-compacting press was subjected to sextupolar magnetization.
Figure 9:
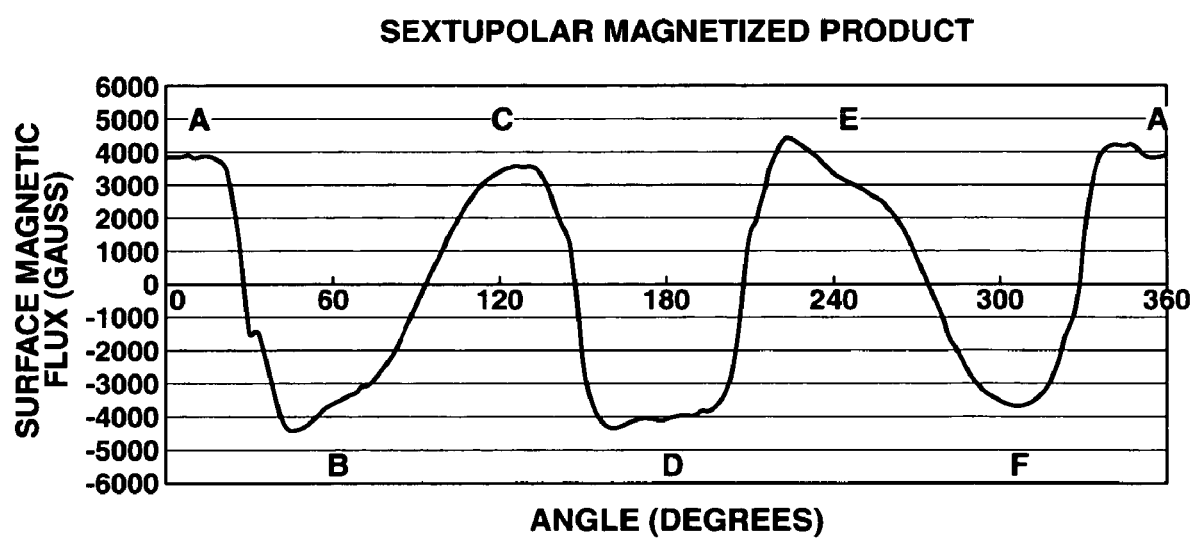
FIG. 9 shows the surface magnetic flux density when a Nd—Fe—B-based cylindrical magnet manufactured using a prior-art horizontal magnetic field-generating vertical-compacting press was subjected to sextupolar magnetization.

FIG. 8 shows the surface magnetic flux measured for the rotor magnet obtained in Example 1 according to the invention, and FIG. 9 shows the surface magnetic flux measured for the rotor magnet obtained in Comparative Example 3. In Example 1, each pole is homogeneous and has a large surface area relative to Comparative Example 3. Hence, in the example according to the invention, a large magnetic field can be uniformly generated.

Through the invention, there can be obtained radially anisotropic ring magnets which are endowed with good magnetic characteristics.

The invention claimed is:

1. A method of manufacturing radially anisotropic ring magnets in which a magnet powder packed into a cavity in a cylindrical magnet-forming mold having a core composed at least in part of a ferromagnetic material with a saturation magnetic flux density of at least 5 kG is pressed under the application of an orienting magnetic field by a horizontal magnetic field vertical compacting process; the method comprising the steps of:
   carrying out at least one of the following operations (i) to (v) so as to apply to the magnet powder a magnetic field from a plurality of direction rather than one direction;
   (i) rotate the magnet powder a given angle in the circumferential direction of the mold during application of the magnetic field,
   (ii) rotate the magnet powder a given angle in the circumferential direction of the mold following application of the magnetic field, then again apply a magnetic field,
   (iii) rotate a magnetic field-generating coil a given angle in the circumferential direction of the mold with respect to the magnet powder during application of the magnetic field,
   (iv) rotate a magnetic field-generating coil a given angle in the circumferential direction of the mold with respect to the magnet powder following application of the magnetic field, then again apply a magnetic field, and
   (v) use a plurality of coil pairs to first apply a magnetic field with one coil pair, then apply a magnetic field with the other coil pair,
   after applying a magnetic field one or more times, rotating the magnet powder at 60 to 120°+n×180° (where n is an integer≧0) under an application of a coil-generated magnetic field of at least 0 but less than 0.5 kOe, the latter magnetic field being from 1/20 to 1/3 as large as the magnetic field previously applied;
   pressing the magnetic powder during or after the application of the latter magnetic field; and
   obtaining a radically anisotropic ring magnet having throughout the magnet an angle of 80 to 100° between a center axis thereof and a radial anisotropy imparting direction.

2. The method of manufacturing radially anisotropic ring magnets according to claim 1, wherein if the packed magnet powder is rotated, such rotation is effected by rotating at least the core, die or punch of the mold in the circumferential direction thereof.

3. The method of manufacturing radially anisotropic ring magnets according to claim 1, wherein if the packed magnet powder is rotated after application of a magnetic field, the ferromagnetic core and the magnet powder have remanent magnetization values of at least 50 G and the magnet powder is rotated by rotating the core in the circumferential direction.

4. The method of manufacturing radially anisotropic ring magnets according to any one of claims 1 to 3, wherein the magnetic field generated during the horizontal magnetic field vertical compacting step is from 0.5 to 10 kOe.

5. The method of manufacturing radially anisotropic ring magnets according to claim 1, wherein the magnetic field generated by a horizontal magnetic field vertical-compacting press just before or during pressing is from 0.5 to 3 kOe.

* * * * *